United States Patent [19]

Jobe

[11] Patent Number: 4,649,952

[45] Date of Patent: Mar. 17, 1987

[54] COMBINED SHUT OFF AND CHECK VALVE

[75] Inventor: Benjamin L. Jobe, Houston, Tex.

[73] Assignee: Jogler, Inc., Houston, Tex.

[21] Appl. No.: 848,241

[22] Filed: Apr. 4, 1986

[51] Int. Cl.⁴ .............................................. F16K 15/18
[52] U.S. Cl. ............................ 137/614.16; 137/614.2; 137/901
[58] Field of Search .................... 137/614.16, 614.17, 137/614.2, 901

[56] References Cited

U.S. PATENT DOCUMENTS

| 675,665 | 6/1901 | McCanna | 137/901 X |
| 902,894 | 11/1908 | Matthews | 137/614.2 X |
| 1,108,009 | 8/1914 | Seiss et al. | 137/614.17 X |
| 1,111,409 | 9/1914 | Scott | 137/614.2 |
| 2,869,582 | 1/1959 | Skipwith, Jr. | 137/614.2 X |
| 3,247,862 | 4/1966 | Burke | 137/614.2 X |
| 4,422,472 | 12/1983 | Klein | 137/614.2 X |

Primary Examiner—Alan Cohan
Assistant Examiner—John A. Rivell
Attorney, Agent, or Firm—Vaden, Eickenroht, Thompson & Boulware

[57] ABSTRACT

A combination shut off and check valve is disclosed in which the shut off valve function is provided by a manipulable ball closure. The ball closure includes a seat in its flow hole on its upstream side for accepting a loose ball included in a chamber upstream of the ball closure. The loose ball will not seat itself ordinarily because the chamber is sufficiently large so as to cause the center of the loose ball to be below the central axis of the ball closure flow hole. A pressure differential in the downstream direction causes the loose ball to roll up an inclined ramp leading to the flow hole, where it seats in check valve fashion.

4 Claims, 5 Drawing Figures

COMBINED SHUT OFF AND CHECK VALVE

BACKGROUND OF THE INVENTION

1. Field of the Invention

This invention pertains to flow control valves and particularly to a combination shut off and check valve.

2. Description of the Prior Art

Liquid which is either stored or in a flowing state through a transmission line must be handled or diverted and/or monitored at one or more stages or points. Such points occur at junctions or terminals and often utilize a valve to perform an operation with respect to the liquid at the point. As an example, it is common to employ a liquid sight monitor in a liquid transmission line so that the condition of the liquid in the line can be observed. A valve is generally located upstream of the sight monitor so that flow can be shut off in order to clean or replace the sight monitor when such maintenance need arises.

Although a valve for the above purpose can take the form of many shapes, a common valve type is a ball valve. A typical ball valve includes a ball closure located in the housing of the valve. The ball closure has a flow hole therethrough having approximately the same internal diameter as the bore through the valve housing. Such housing bore, in turn, has approximately the same internal diameter as the internal diameter of the transmission line. Hence, when the ball is swiveled so that the flow hole through the ball closure is aligned with the bore of the housing, there is a continuous flow passage through the valve. When the ball closure is rotated or swiveled in its housing by 90 degrees from its open position, the passage through the valve is blocked or shut off.

Another type of valve that is employed in liquid storage or transmission systems is a check valve. Such a valve normally includes a valve seat around a port in line with the transmission line and a ball or other shape closure that mates with the seat. Predominant liquid fluid is in a direction opposing the closure. When the flow pressure falls below a predetermined level, an opposing spring, gravity or pressure differential action causes the closure to automatically seat with the valve seat to thereby positively close the valve.

Turning again to the example of a liquid sight monitor, if the glass breaks or the seals around the device should give way so as to cause a breach, the liquid contents of the adjoining transmission line or storage tank will spill out through the breach unless there is a check valve in place to prevent this from happening. A check valve, as noted above, is an automatically operating valve and is not one that is normally externally manipulable.

If it is desirable to have both a shut off valve and a check valve at the same location, it has been necessary to employ two separate valves or at least valve structures, although perhaps both could be located in serial in a common housing. A simple combination valve has not been available.

Therefore, it is a feature of the present invention to provide an improved valve combining in a single, simplified structure the functions of both a shut off valve and a check valve.

SUMMARY OF THE INVENTION

The valve disclosed herein includes in the valve housing, which is intended for horizontal installation, a manipulable ball closure with a flow hole therethrough. The ball closure can be swiveled open and shut in a manner familiar with ball valves. The upstream side of the flow hole includes a valve seat. Within the housing on the upstream side of the ball closure, there is a chamber which is larger in diameter than the diameter of the ball closure flow hole. The chamber is externally ported on its upstream side.

A loose ball is confined within the chamber in that it is larger in size than the flow hole of the ball closure and the upstream chamber opening. When the ball rests on the bottom of the chamber its center is below the center axis of the flow hole in the ball closure. Thus, when the loose ball moves toward the ball closure, it does not seat in the flow hole.

Built into the housing immediately in front of the flow hole is a ramp surface.

In operation where there is ordinary movement of the liquid flow stream, or no movement as in a storage situation, the pressure differential across the valve is slight, if any. The ball closure is then turned to be open or shut in ball valve fashion. If there is a pressure differential that develops larger than a predetermined level, such as caused by a line break downstream of the valve, the pressure behind the ball will cause it to roll up the ramp and seat in the flow hole of the ball closure in check-valve fashion.

By rotating the ball closure to a partly open position so that the flow hole is not axially aligned with the bore of the housing, the ball is prevented from acting in check-valve fashion. The position is suitable for the ball closure to allow filling the liquid system connected to the valve by reverse flow action through the valve.

Finally, appropriate stand off means, which can be a separate element such as a leaf spring or just a suitable lip in the chamber near the upstream port opening, is included to prevent the ball from seating in the chamber opening should a temporary reverse fluid flow through the valve occur.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawing forms a part of this specification. It is to be noted, however, that the appended drawings illustrate only a preferred embodiment of the invention and are therefore not to be considered limiting of its scope, for the invention may admit to other equally effective embodiments.

In the Drawings.

DESCRIPTION OF THE PREFERRED EMBODIMENT

Figure 1:
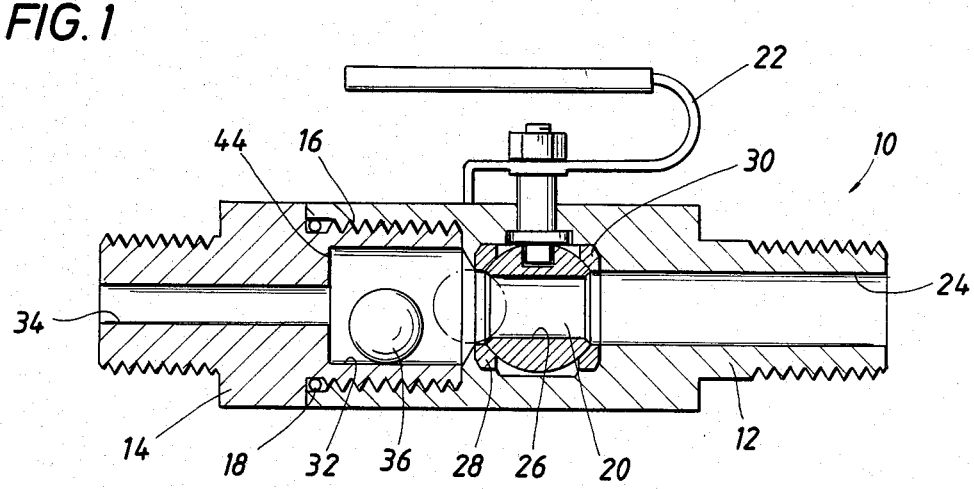
FIG. 1 is a cross-sectional side view of a preferred embodiment of a combination shut off and check valve in accordance with the present invention.

Now referring to the drawings and first to FIG. 1, a valve housing 10 is horizontally positioned and generally comprises a right hand section 12 and a left hand section 14. Each section is suitably externally threaded for connection to a liquid system, such as a transmission line or a storage tank. Right hand section 12 is for connection to the downstream side and left hand section 14 is suitable for connection to the upstream side of the liquid system. A sight monitor (not shown) could conveniently be connected on the downstream side of the valve housing. The two sections of the housing are threaded together at threads 16. A convenient O-ring seal 18 is provided behind threads 16. A ball valve closure 20 to be described more fully hereafter operates in valve housing section 12 and is manipulatable by external handle 22.

Bore opening 24 through section 12 is approximately the same dimension as the opening through the fluid system conduit (not shown) which is attached to the valve housing at the external threads of section 10. Flow hole 26 through the ball closure is approximately the same diameter as bore opening 24. It should be noted that the ball closure operates with respect to seal rings 28 and 30 located on either side thereof in order to prevent fluids from leaking around the closure regardless of its swivel orientation.

Section 14 on the left side of the valve includes a chamber 32 which is larger in diameter size than bore opening 24 and flow hole 26. The chamber adjoins the ball valve closure on its right side and includes a port or opening 34 on its upstream side. The port dimension is the same size as or has a smaller diameter than bore opening 24 and flow hole 26.

A ball 36 is located within chamber 32 and is free to move about the chamber including particularly away from the ball closure. Dimensionally the diameter of ball 36 is larger than either port 34 or flow hole 26 and therefore it is confined within chamber 32 at all times.

Figure 2:
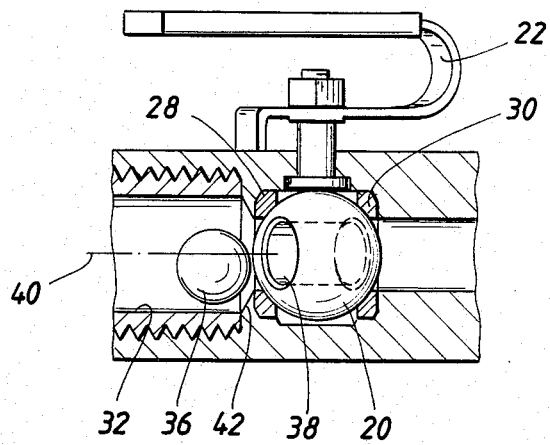
FIG. 2 is a partial cross-sectional side view of the valve shown in FIG. 1 to reveal the configuration of the seat of the ball closure flow hole.

The valve handle is shown partly rotated in FIG. 2 to expose the seat side, or the side of ball closure 20 which is adjacent chamber 32. Seat 38 is conically shaped or otherwise tapered and surfaced in a manner well known in the art to affect a seal when ball 36 is snugly in contact with it. As previously mentioned, chamber 32 is sufficiently large and dimensioned in connection with ball 36 so that the center of ball 36 is below the central axis 40 of flow hole 26 when ball 36 rests on the bottom of the chamber. A beveled or ramped surface 42 is included in housing section 14 just in front of ball closure 20. This ramp forms a slanted shoulder upstream of the ball closure that permits ball 36 to roll there up under the right pressure differential conditions, as explained below, to seat in seat 38.

On the upstream side of the chamber a leaf spring or other stand off means 44 is included in chamber 32 to prevent ball 36 from seating on the opening edge of port 34.

When the ball valve is subjected to normal operation with the flow hole in the open condition, such as shown in FIG. 1, there is very little pressure differential across ball closure 20 of the valve. That is, the fluid is either standing in the valve housing, as with a storage condition, or there is a slight flowing movement through the valve. Such slight movement of the fluid through the valve would not be sufficient to cause ball 36 to roll up ramp 42 and seat itself on seat 38 of the flow hole in the ball closure. Therefore, there would be fluid movement through the housing, including in chamber 32 around ball 36, under normal conditions.

Figure 3:
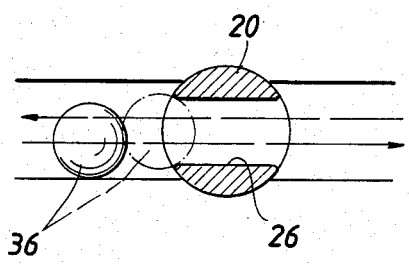
FIG. 3 is a top schematic view of the valve shown in FIG. 1 when the ball closure flow hole is in axial alignment with the valve housing.
Figure 4:
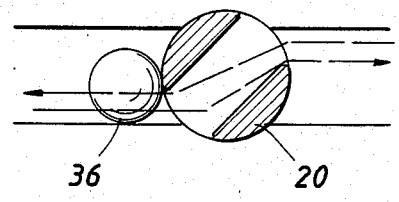
FIG. 4 is a top schematic view of the valve shown in FIG. 1 when the ball closure flow hole is at an acute angle to the axis of the valve housing.

When there is a pressure differential established across the valve housing such as caused by a pressure loss on the downstream side that would be present in the event of a downstream breach, then the pressure differential across the ball closure would be sufficient to cause ball 36 to roll up ramp 42 and seat itself in check ball fashion in seat 38 of the flow hole. As long as the pressure upstream exceeded the pressure downstream, or so long as handle 22 is not manipulated, seating in the fashion just described will remain. FIGS. 1 and 3 show in dotted view the position of ball 36 seated in flow hole 26 under these conditions.

When the valve is manipulated at a 45° angle or other angle sufficient to keep ball 36 from seating in seat 38 due to the swivel position of ball closure 20, the valve mechanism is still partly open and, therefore, satisfactory for reverse flow filling or refilling of the fluid or liquid system through the valve without concern for interruptions that might otherwise be caused by the loose ball seating in the flow hole seat. Preferably, the position should be a stable position, such as provided by an appropriate detent. As soon as the filling operation is concluded, then the ball closure could be returned to its full open position, as shown in FIG. 1.

Figure 5:
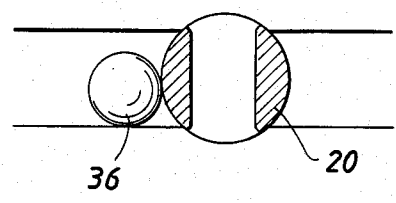
FIG. 5 is a top schematic view of the valve shown in FIG. 1 when the ball closure is in the closed position.

Finally, FIG. 5 illustrates the rotation of the ball closure so as to shut off flow altogether. Thus, it can be seen that ball 36 in no way interferes with the mechanical manipulation of the ball closure in its open, closed, or partly opened positions.

While a preferred embodiment of the invention has been shown and described, it will be understood that the invention is not limited thereto as many modifications may be made and will become apparent to those skilled in the art.

What is claimed is:

1. A combined shut off and check valve, comprising
   a valve housing for horizontal installation having a bore therethrough,
   a ball closure having a flow hole therethrough with a seat no greater than said housing bore, said ball closure being mounted for swivelly opening and closing said bore,
   said housing including a chamber on the upstream side of said ball closure and having an upstream opening, and
   a ball confined in said chamber, the center of said ball being below the central axis of said flow hole when said ball rests on the lower side of said chamber during normal operating pressure differential across said ball closure, the ball being of a diameter such that it is capable of seating on the flow hole seat, an abnormally high operating upstream-to-downstream pressure causing said ball to seat in said flow hole seat of said ball closure.

2. A combined valve in accordance with claim 1, wherein said housing includes a slanted shoulder upstream from said ball closure that permits said ball to roll up to seat with said flow hole seat of said ball closure in the presence of an abnormally high operating upstream-to-downstream pressure.

3. A combined valve in accordance with claim 1, and including stand off means to prevent said ball from upstream seating with said upstream opening in said chamber.

4. A combined valve in accordance with claim 1, wherein said ball closure has a stable part-open swivel position such that reverse flow can proceed through said flow hole of said ball closure and around said ball, said flow hole being at an angle sufficient to prevent said ball from seating in the event of reverse flow interruption.

* * * * *